(12) United States Patent
Hennessey

(10) Patent No.: US 6,191,384 B1
(45) Date of Patent: Feb. 20, 2001

(54) APPARATUS FOR TRIMMING DYE COATED ON A RECORDABLE DISC SUBSTRATE AND RELATED METHOD

(75) Inventor: Michael Hennessey, South Lyon, MI (US)

(73) Assignee: Tapematic S.p.A., Milan (IT)

( * ) Notice: Under 35 U.S.C. 154(b), the term of this patent shall be extended for 0 days.

(21) Appl. No.: 09/073,304

(22) Filed: May 5, 1998

(51) Int. Cl.$^7$ .................................................. B23K 26/00
(52) U.S. Cl. ............................ 219/121.68; 219/121.75; 219/121.84; 264/400
(58) Field of Search ..................... 219/121.68, 121.69, 219/121.73, 121.75, 121.82, 121.84, 121.85, 121.6; 427/555; 264/400; 369/284, 286

(56) References Cited

U.S. PATENT DOCUMENTS

| | | |
|---|---|---|
| 4,038,663 * | 7/1977 | Day et al. ................... 219/121.68 X |
| 4,076,536 | 2/1978 | Schlesinger et al. . |
| 4,527,173 | 7/1985 | Gupta et al. . |
| 4,538,159 | 8/1985 | Gupta et al. . |
| 4,656,121 | 4/1987 | Sato et al. . |
| 4,740,447 | 4/1988 | Itoh . |
| 4,913,949 | 4/1990 | Steininger et al. . |
| 4,944,967 | 7/1990 | Yabe et al. . |
| 5,018,128 | 5/1991 | Goldberg . |
| 5,019,487 | 5/1991 | Gravesteijn et al. . |
| 5,023,167 | 6/1991 | Kalyanaraman et al. . |
| 5,079,061 | 1/1992 | Hashida et al. . |
| 5,100,766 | 3/1992 | Fukui et al. . |
| 5,132,153 | 7/1992 | Hirose et al. . |
| 5,151,342 | 9/1992 | Wiedemann . |
| 5,171,480 | 12/1992 | Yoshinaka et al. . |
| 5,185,194 | 2/1993 | Miyake et al. . |
| 5,186,995 | 2/1993 | Yoshizawa et al. . |
| 5,196,231 | 3/1993 | Hirose et al. . |
| 5,196,250 | 3/1993 | Abe et al. . |
| 5,246,758 | 9/1993 | Matsui et al. . |
| 5,260,165 | 11/1993 | Satou et al. . |
| 5,424,508 * | 6/1995 | Swain et al. ................. 219/121.84 |
| 5,428,599 | 6/1995 | Yashima et al. . |
| 5,455,818 | 10/1995 | Ohashi . |
| 5,486,396 * | 1/1996 | Mizukuki et al. ............... 369/272 X |
| 5,487,926 | 1/1996 | Kuribayashi et al. . |
| 5,506,022 | 4/1996 | Ide . |
| 5,510,164 | 4/1996 | Best et al. . |
| 5,523,140 | 6/1996 | Tominaga et al. . |
| 5,545,454 | 8/1996 | Yamada et al. . |
| 5,549,953 | 8/1996 | Li . |
| 5,569,517 | 10/1996 | Tominaga et al. . |
| 5,578,415 | 11/1996 | Hayashi et al. . |
| 5,580,632 | 12/1996 | Ohkawa et al. . |
| 5,585,201 | 12/1996 | Ha . |
| 5,591,500 | 1/1997 | Kawanishi . |
| 5,604,002 | 2/1997 | Tsujioka et al. . |
| 5,604,003 | 2/1997 | Coombs et al. . |
| 5,607,739 | 3/1997 | Bartholomeusz . |

(List continued on next page.)

FOREIGN PATENT DOCUMENTS 2-183442 * 7/1990 (JP) .

OTHER PUBLICATIONS

Cunningham, R., "Delivering Nd:YAG laser beams the easy way," Lasers & Optronics, Sep. 1990, pp. 59, 60, 62, 64.*
Tonshoff et al., "Diode lasers for material processing," Journal de Physique, vol. 4, No. 4, Apr. 1994, pp. 59–63.*

*Primary Examiner*—Samuel M. Heinrich
(74) *Attorney, Agent, or Firm*—Frommer Lawrence and Haug LLP

(57) ABSTRACT

An apparatus and method for trimming dye coated on a recordable disc substrate during production of an optical memory disc which includes a substrate rotation assembly for rotating the disc substrate, an optic assembly for directing a laser beam directly upon the rotatable substrate to trim the dye coated thereon, and a process byproduct removing assembly for removing the trimmed byproducts from the substrate.

67 Claims, 1 Drawing Sheet

U.S. PATENT DOCUMENTS

| | | |
|---|---|---|
| 5,612,108 | 3/1997 | Hatwar et al. . |
| 5,612,109 | 3/1997 | Tyan et al. . |
| 5,618,638 | 4/1997 | Taki . |
| 5,620,766 | 4/1997 | Uchiyama et al. . |
| 5,631,056 | 5/1997 | Kawanishi et al. . |
| 5,637,370 | 6/1997 | Danz et al. . |
| 5,637,371 | 6/1997 | Tominaga et al. . |
| 5,645,908 | 7/1997 | Shin . |
| 5,645,909 | 7/1997 | Kobayashi et al. . |
| 5,648,134 | 7/1997 | Shiratori et al. . |

\* cited by examiner

APPARATUS FOR TRIMMING DYE COATED ON A RECORDABLE DISC SUBSTRATE AND RELATED METHOD

FIELD OF THE INVENTION

The present invention relates to an apparatus and process for cleaning selected areas of an optical memory disc substrate during production of an optical memory disc, and more particularly, to a laser trimming system for cleaning dye from the outer edge of a disc substrate used in a CD-R or DVD-R manufacturing process.

BACKGROUND OF THE INVENTION

The typical structure of a CD-R or DVD-R disc includes an energy absorbing dye layer deposited directly over a polymeric substrate. Next, a thin film reflective layer is typically formed directly over the dye layer, usually via magnetron sputtering. This reflective layer also functions as a barrier layer to isolate the dye layer. Finally, a radiation curable protective lacquer is applied directly over the reflective layer.

Because of cumulative stress associated with these various layers, the structure may tend to delaminate, starting at the outermost edge of the substrate. In order to reduce the likelihood of this type of failure, the protective lacquer must bond directly to the substrate surface at the outer edge of the substrate. Additionally, allowing the protective lacquer to bond directly to the polymeric substrate provides an effective barrier to atmospheric contamination of the energy absorbing and reflective layers. Simple masking can be used to shield the outer edge of the substrate during deposition of the reflective layer. However, masking is not practical during the spin coating step used to apply the dye layer. Some means of trimming the dye at the outer edge of the disc is therefore required, as removal of the dye at the outer edge of the disc is advantageous in preventing failure of the coated structure.

Typical approaches to trimming the dye at the outer edge of the disc include solvent "washing" and mechanical trimming operations. Solvent washing, however, requires precise control over the application and spin drying process. In addition, the initial cost of solvent, plus the cost of contaminated solvent disposal are substantial. Mechanical edge trimming is relatively easy to implement. However, debris generation, tooling wear, and proper cooling must be considered. Therefore, it has been found desirable to provide an edge trimming system for an optical memory disc which avoids these limitations and is easily implemented, reliable, and economical.

OBJECTS OF THE INVENTION

Therefore, it is an object of the present invention to provide an improved apparatus and method for selectively trimming dye from a recordable optical memory disc substrate which avoids the aforementioned disadvantages of the prior art.

An additional object of the present invention is to provide an improved apparatus and method for selectively trimming dye from a recordable optical memory disc substrate which reduces operating expenses by eliminating the use of washing solvents and toxic solvent disposal.

Another object of this invention is to provide an improved apparatus and method for selectively trimming dye from a recordable optical memory disc substrate which reduces maintenance expenses.

A further object of this invention is to provide an improved apparatus and method for selectively trimming dye from a recordable optical memory disc substrate which improves product quality and reliability.

Various other objects, advantages and features of the present invention will become readily apparent from the ensuing detailed description and the novel features will be particularly pointed out in the appended claims.

SUMMARY OF THE INVENTION

In accordance with the present invention, an apparatus and method for selectively trimming a substrate for a recordable optical memory disc is provided which includes a substrate rotation assembly for rotating the disc substrate, an optical energy generation assembly, an optical assembly which receives the optical energy and directs a shaped beam directly upon the rotatable substrate to trim the dye coated thereon, and a byproduct removal assembly to direct the process byproducts away from the disc substrate for subsequent collection by a byproduct collection system.

In the apparatus and method of the present invention, an optical energy generation assembly in the form of a commercially available multi-diode semiconductor laser array produces the optical energy and supplies the energy to the optical assembly. The optical assembly of the present invention includes a fiber optic delivery system which receives the energy from the optical energy generation assembly and a focusing system for shaping the beam and directing the beam directly upon the rotatable substrate to trim the dye coated thereon.

In order to trim dye during production of optical disc substrates, such as optical disc substrates used in a CD-R and DVD-R process, a laser is utilized which has a wavelength between approximately 450 and 800 nm and has a maximum power of approximately 12 watts. In addition, the laser beam is shaped by the focusing optic system to have a diameter of approximately 0.5 to 1.5 mm and is collimated within a length of between approximately 2 to 5 mm.

In order to remove the byproducts of the dye trimming operation away from the disc substrate, a byproduct removal assembly is utilized which is in the form of a fluidic jet assembly attached to the focusing optic system so as to extend at an angle of between approximately 5° to 80° toward a byproduct collection unit. The fluid discharged from the fluidic jet assembly can be any inert gas, such as nitrogen, argon or helium. In addition, air can be discharged from the jet as well as cryogenic liquids, such as carbon dioxide and nitrogen. However, in order to lower power requirements, or facilitate special processing, a reactive gas, such as oxygen, carbon monoxide or methane, can be also discharged from the fluidic jet assembly.

Accordingly, the trimming apparatus and method of the present invention reduces operating expenses, by eliminating the cost of edge washing solvent and toxic solvent disposal, reduces maintenance expenses, due to its simple and reliable nature, and improves product quality and reliability, due to its superior performance.

BRIEF DESCRIPTION OF THE DRAWINGS

The following detailed description, given by way of example, will best be understood in conjunction with the accompanying drawing in which.

DETAILED DESCRIPTION OF CERTAIN PREFERRED EMBODIMENTS

Figure 1:
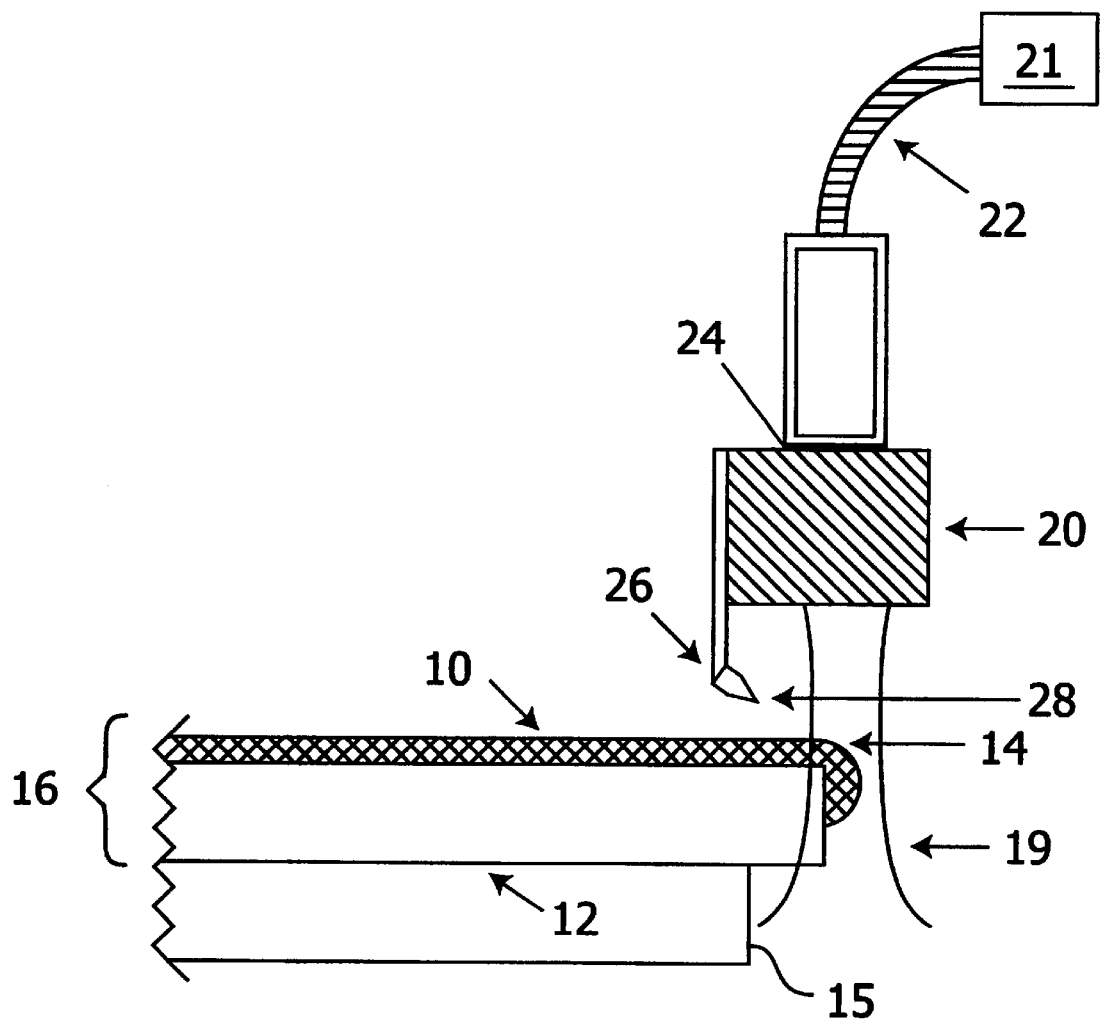
FIG. 1 is a schematic representation of a preferred embodiment of an apparatus and method for cleaning dye coated on an outer edge of a recordable disc substrate during production thereof in accordance with the teachings of the present invention.

Referring now to the drawing, there is illustrated a preferred embodiment of an apparatus for trimming dye coated on an outer edge of a recordable disc substrate during production of an optical memory disc, such as a CD-R or a DVD-R. As aforementioned, the typical structure of a CD-R or DVD-R optical memory disc includes an energy absorbing dye layer 10 deposited directly over a polymeric substrate 12. Next, a thin film reflective layer, such as gold, silver or aluminum, is formed directly over the dye layer, usually via magnetron sputtering. Finally, a radiation curable protective lacquer is applied directly over the reflective film layer.

The present invention provides an apparatus and method for trimming the dye coated at the outer edge of the polymeric substrate, as is represented by the outer edge dye portion 14 in FIG. 1. As previously discussed, trimming of the dye at the outer edge of the substrate is advantageous in preventing coating stack curl back, edge diffusion and subsequent failure of the optical memory disc.

In the apparatus of the present invention, the optical memory disc 16 including a polycarbonate substrate 12 and dye layer 10 is positioned on a substrate rotation assembly 15 which rotates the disc substrate. While the disc substrate is rotated, an optical assembly 20 receives laser energy and directs a shaped laser beam (see 19 in FIG. 1) directly upon the outer edge dye portion 14 of the rotatable substrate to trim the outer edge dye coated thereon.

As is shown in FIG. 1, a laser energy generation assembly 21, preferably in the form of a multi-diode semiconductor laser array, produces the laser energy and supplies the laser energy to the optical assembly 20. The optical assembly 20 includes a fiber optic delivery system 22 which receives the laser energy from the laser generation assembly 21 and passes the laser energy to the focusing optic system 24 of the optical assembly 20. The focusing optic system 24 shapes the laser beam and directs the laser beam directly upon the outer edge of the rotatable substrate to trim the outer edge dye portion 14 coated thereon.

The wavelength of the laser beam can be optimized to suit the requirements of the media being used. Moreover, it has been found that laser wavelengths of approximately 550 and 720 nm are preferred for trimming the outer edge dye portion 14 from an optical memory disc substrate used respectively to produce a DVD-R optical memory disc and a CD-R optical memory disc. However, suitable cleaning of the dye from the outer edge of CD-R disc substrates has been accomplished by utilizing a laser beam having a wavelength of approximately 690 nm with a maximum power of approximately 12 watts. However, acceptable trimming results have been attained with a laser power between approximately 6 to 8 watts.

The exact wavelength and power used effect the trimming results. Results range from complete removal of the dye to a fusing of the dye with the substrate material. As one illustrative example, a polycarbonate substrate coated with phthalocyanine dye produced by Ciba Specialty Chemicals was effectively edge-trimmed using a 10 watt, 690 nm laser beam directed at the rotating substrate for approximately 4 seconds. The laser beam was shaped by the focusing optic system 24 to have a diameter of approximately 1 mm and was collimated over a length of approximately 3 mm. The effectiveness of the procedure was verified by subsequent adhesion testing.

In order to direct the trimming process byproducts away from the disc substrate, as is shown in FIG. 1, a byproduct removing assembly 26 is attached to the optic assembly 20. The byproduct removal assembly 26 includes an orifice 28 which is mounted at an angle of approximately 45° toward the outer edge of the disc substrate. In the preferred embodiment, the byproduct removal assembly 26 is a fluidic jet. The fluid discharged from the fluidic jet can be any inert gas, such as nitrogen, argon or helium. In addition, air can be discharged from the fluidic jet as well as cryogenic liquids, such as nitrogen and carbon dioxide. In order to reduce the laser power requirements, or to facilitate special processing, the fluid discharged from the fluidic jet can be a reactive gas, such as oxygen, methane or carbon monoxide.

During testing of the apparatus and method of the present invention, it has been demonstrated that the laser beam had no effect on uncoated polycarbonate. The surface modification effect resulting therefrom was primarily due to energy absorption by the dye. The power requirements set forth above achieved complete removal of the dye, and a slight texturing of the polycarbonate surface. This texturing further improves adhesion of the protective lacquer to the polycarbonate substrate.

As a result, in accordance with the general objects of the present invention, the method and apparatus of the present invention reduces operating expenses, by eliminating the cost of edge washing solvents and toxic solvent disposal, reduces maintenance expenses, due to the simple and reliable nature of the approach, and improves product quality and reliability, due to superior edge cleaning performance.

While the present invention has been particularly shown and described with reference to certain preferred embodiments, it will be readily apparent to those of ordinary skill in the art that various changes and modifications may be made therein without departing from the spirit of the scope of the invention. It is intended that the appended claims be interpreted as including the foregoing as well as various other such changes and modifications.

What is claimed is:

1. An apparatus for trimming dye coated on an outer edge of a recordable disc substrate during production of an optical memory disc comprising:

substrate rotation means for rotating the disc substrate;

an optical assembly having means for receiving laser energy and for directing said laser energy directly upon the outer edge of the rotatable substrate to trim the dye coated thereon and thereby produce byproducts of the trimming operation; and means for removing the byproducts of the trimming operation from the substrate.

2. The apparatus for trimming dye coated on a recordable disc substrate during production of an optical memory disc of claim 1 and further comprising laser generation means for producing the laser energy and for supplying said laser energy to said laser energy receiving and directing means.

3. The apparatus for trimming dye coated on a recordable disc substrate during production of an optical memory disc of claim 2 wherein said laser generation means is a multi-diode semi-conductor laser array.

4. The apparatus for trimming dye coated on a recordable disc substrate during production of an optical memory disc of claim 2 wherein said laser energy receiving and directing means includes a fiber optic delivery system receiving the laser energy from the laser generation means.

5. The apparatus for trimming dye coated on a recordable disc substrate during production of an optical memory disc of claim 2 wherein said laser energy receiving and directing means includes a focusing optic system for shaping and collimating a laser beam and directing the laser beam directly upon the rotatable substrate to trim the dye coated thereon.

6. The apparatus for trimming dye coated on of a recordable disc substrate during production of an optical memory disc of claim 5 wherein the laser beam is collimated by said focusing optic system with a diameter of approximately 0.5 to 1.5 mm.

7. The apparatus for trimming dye coated on a recordable disc substrate during production of an optical memory disc of claim 5 wherein the laser beam is collimated within a length between approximately 2 to 5 mm.

8. The apparatus for trimming dye coated on a recordable disc substrate during production of an optical memory disc of claim 5 wherein said focusing optic system is stationarily mounted.

9. The apparatus for trimming dye coated on a recordable disc substrate during production of an optical memory disc of claim 1 wherein the laser beam has a wavelength between approximately 450 and 800 nm.

10. The apparatus for trimming dye coated on a recordable disc substrate during production of an optical memory disc of claim 1 wherein the laser beam has a wavelength between approximately 550 and 720 nm.

11. The apparatus for trimming dye coated on a recordable disc substrate during production of an optical memory disc of claim 1 wherein the laser beam is produced with a maximum power of approximately 12 watts.

12. The apparatus for trimming dye coated on a recordable disc substrate during production of an optical memory disc of claim 1 wherein the laser beam is produced with a power of approximately 6 to 8 watts.

13. The apparatus for trimming dye coated on a recordable disc substrate during production of an optical memory disc of claim 1 wherein said rotatable disc substrate is supported on said substrate rotation means along a support axis and said byproduct removing means is a fluidic jet for directing the process byproducts away from the rotatable disc substrate, said fluidic jet having an angularly disposed dispersion orifice which is angularly displaced at an angle of between approximately 5° to 80° from said support axis.

14. The apparatus for trimming dye coated on a recordable disc substrate during production of an optical memory disc of claim 13 wherein the fluid discharged from said fluidic jet is an inert gas selected from the group consisting of nitrogen, argon and helium.

15. The apparatus for trimming dye coated on a recordable disc substrate during production of an optical memory disc of claim 13 wherein the fluid discharged from said fluidic jet is air.

16. The apparatus for trimming due coated on a recordable disc substrate during production of an optical memory disk of claim 13 wherein the fluid discharged from said fluidic jet is a cryogenic liquid selected from the group consisting of nitrogen and carbon dioxide.

17. The apparatus for trimming dye coated on a recordable disc substrate during production of an optical memory disc of claim 13 wherein the fluid discharged from said fluidic jet is a reactive fluid.

18. The apparatus for trimming dye coated on a recordable disc substrate during production of an optical memory disc of claim 17 wherein the reactive fluid is selected from the group consisting of oxygen, methane and carbon monoxide.

19. An apparatus for trimming dye coated on an outer edge of a recordable disc substrate during production of an optical memory disc comprising:
  substrate rotation means for rotating the disc substrate;
  an optical assembly having means for receiving laser energy and for directing said laser energy directly upon the outer edge of the rotatable substrate to trim the dye coated thereon and thereby produce byproducts of the trimming operation wherein said laser energy receiving and directing means includes a focusing optic system for collimating the laser beam and directing the laser beam directly upon the outer edge of the rotatable substrate to trim the dye coated thereon wherein the laser beam has a wavelength between approximately 450 and 800 nm, is collimated by said focusing optic system with a diameter of between approximately 0.5 to 1.5 mm, and is collimated within a length of between approximately 2 to 5 mm;
  laser generation means for producing the laser energy and for supplying said laser energy to said laser energy receiving and directing means wherein the laser beam is produced with a maximum power of approximately 12 watts; and
  means for removing the process byproducts from the substrate.

20. The apparatus for trimming dye coated on a recordable disc substrate during production of an optical memory disc of claim 19 wherein said laser energy generation means is a multi-diode semi-conductor laser array.

21. The apparatus for trimming dye coated on a recordable disc substrate during production of an optical memory disc of claim 19 wherein said laser energy receiving and directing means includes a fiber optic delivery system receiving the laser energy from the laser generation means.

22. The apparatus for trimming dye coated on a recordable disc substrate during production of an optical memory disc of claim 19 wherein the laser beam has a wavelength between approximately 550 and 730 nm.

23. The apparatus for trimming dye coated on a recordable disc substrate during production of an optical memory disc of claim 19 wherein the laser beam is produced with a power of between approximately 6 to 8 watts.

24. The apparatus for trimming dye coated on a recordable disc substrate during production of an optical memory disc of claim 19 wherein the laser beam is collimated within a length of between approximately 2 to 3 mm.

25. The apparatus for trimming dye coated on a recordable disc substrate during production of an optical memory disc of claim 19 wherein said focusing optic system is stationarily mounted.

26. The apparatus for trimming dye coated on a recordable disc substrate during production of an optical memory disc of claim 19 wherein said rotatable disc substrate is supported on said substrate rotation means along a support axis and said byproduct removing means is a fluidic jet for directing the process byproducts away from the substrate, said fluidic jet having an angularly disposed dispersion orifice which is angularly displaced at an angle of between approximately 5° to 80° from said support axis.

27. The apparatus for trimming dye coated on a recordable disc substrate during production of an optical memory disc of claim 26 wherein the fluid discharged from said fluidic jet is an inert gas selected from the group consisting of nitrogen, argon and helium.

28. The apparatus for trimming dye coated on a recordable disc substrate during production of an optical memory disc of claim 26 wherein the fluid discharged from said fluidic jet is air.

29. The apparatus for trimming dye coated on a recordable disc substrate during production of an optical memory disc of claim 26 wherein the fluid discharged from said fluidic jet is a cryogenic liquid selected from the group consisting of nitrogen and carbon dioxide.

30. The apparatus for trimming dye coated on a recordable disc substrate during production of an optical memory disc of claim 26 wherein the fluid discharged from said fluidic jet is a reactive gas.

31. The apparatus for trimming dye coated on a recordable disc substrate during production of an optical memory disc of claim 30 wherein the reactive fluid is selected from the group consisting of oxygen, methane and carbon monoxide.

32. A method for trimming dye coated on an outer edge of a recordable disc substrate during production of an optical memory disc, said method comprising the steps of:
  rotating the disc substrate by means of substrate rotation means;
  receiving laser energy and directing the laser energy directly upon the outer edge of the disc substrate by means of an optical assembly to trim the dye coated thereon and thereby produce process byproducts; and
  removing the process byproducts from the rotatable disc substrate.

33. The method for trimming dye coated on a recordable disc substrate during production of an optical memory disc of claim 32 and further comprising the steps of producing the laser energy and supplying the laser energy to said optical assembly by means of laser energy generation means.

34. The method for trimming dye coated on a recordable disc substrate during production of an optical memory disc of claim 33 wherein said laser energy generation means is a multi-diode semi-conductor laser array.

35. The method for trimming dye coated on a recordable disc substrate during production thereof of claim 33 and further comprising the step of receiving the laser energy from the laser energy generation means by means of a fiber optic delivery system of said optical assembly.

36. The method for trimming dye coated on recordable disc substrate during production of an optical memory disc of claim 32 and further comprising the steps of shaping and collimating the laser beam and directing the laser beam directly upon the rotatable disc substrate by means of a focusing optic system of the optic assembly to trim the dye coated thereon.

37. The method for trimming dye coated on a recordable disc substrate during production of an optical memory disc of claim 36 wherein said laser beam is collimated by said focusing optic system with a diameter of between approximately 0.5 to 1.5 mm.

38. The method for trimming dye coated on a recordable disc substrate during production of an optical memory disc of claim 36 wherein the laser beam is collimated within a length of between approximately 2 to 5 mm.

39. The method for trimming dye coated on a recordable disc substrate during production of an optical memory disc of claim 36 wherein said optic assembly is stationarily mounted.

40. The method for trimming dye coated on a recordable disc substrate during production of an optical memory disc of claim 32 wherein the laser beam has a wavelength between approximately 450 and 800 nm.

41. The method for trimming dye coated on a recordable disc substrate during production of an optical memory disc of claim 32 wherein the laser beam has a wavelength between approximately 550 and 730 mm.

42. The method for trimming dye coated on recordable disc substrate during production of an optical memory disc of claim 32 wherein the laser beam is produced with a maximum power of approximately 12 watts.

43. The method for trimming dye coated on a recordable disc substrate during production of an optical memory disc of claim 32 wherein the laser beam is produced with a power of between approximately 6 to 8 watts.

44. The method for trimming dye coated on a recordable disc substrate during production of an optical memory disc of claim 32 and further comprising the step of removing the process byproducts from the substrate by means of a fluidic jet.

45. The method for trimming dye coated on a recordable disc substrate during production of an optical memory disc of claim 44 and further comprising the step of discharging fluid from the fluidic jet which is an inert gas selected from the group consisting of nitrogen, argon and helium.

46. The method for trimming dye coated on a recordable disc substrate during production of an optical memory disc of claim 44 and further comprising the step of discharging air from the fluidic jet.

47. The method for trimming dye coated on a recordable disc substrate during production of an optical memory disc of claim 44 and further comprising the step of discharging a cryogenic liquid from the fluidic jet selected from the group consisting of nitrogen and carbon dioxide.

48. The method for trimming dye coated on a recordable disc substrate during production of an optical memory disc of claim 44 and further comprising the step of discharging fluid from the fluidic jet which is a reactive fluid.

49. The method for trimming dye coated on a recordable disc substrate during production of an optical memory disc of claim 48 wherein the reactive fluid is selected from the group consisting of oxygen, methane and carbon monoxide.

50. A method for trimming dye coated on an outer edge of a recordable disc substrate during production of an optical memory disc, said method comprising the steps of:
  rotating the disc substrate by means of a substrate rotation means;
  generating laser energy from a laser energy generation means with a maximum power of approximately 12 watts and supplying the laser energy to an optic assembly;
  shaping and collimating the laser beam in a focusing optic system of said optic assembly and directing the laser beam directly upon the outer edge of the rotatable substrate to trim the dye coated thereon and thereby produce process byproducts wherein the laser beam has a wavelength of between approximately 450 and 800 nm, is collimated by said focusing optic system with a diameter of between approximately 0.5 to 1.5 mm, and is collimated within a length of between approximately 2 to 5 mm; and
  removing the trimmed process byproducts from the substrate.

51. The method for trimming dye coated on a recordable disc substrate during production of an optical memory disc of claim 50 wherein said laser energy generation means is a multi-diode semiconductor laser array.

52. The method for trimming dye coated on a recordable disc substrate during production of an optical memory disc of claim 50 and further comprising the step of receiving the laser energy from the laser energy generation means by means of a fiber optic delivery system of said optic assembly.

53. The method for trimming dye coated on a recordable disc substrate during production of an optical memory disc of claim 50 wherein the optic assembly is stationarily mounted.

54. The method for trimming dye coated on a recordable disc substrate during production of an optical memory disc of claim 50 wherein the laser beam has a wavelength of between approximately 550 and 730 nm.

55. The method for trimming dye coated on a recordable disc substrate during production of an optical memory disc of claim 50 wherein the laser beam is produced with a power of between approximately 6 to 8 watts.

56. The method for trimming dye coated on a recordable disc substrate during production of an optical memory disc of claim 50 and further comprising the step of removing the process byproducts from the substrate by means of a fluidic jet.

57. The method for trimming dye coated on a recordable disc substrate during production of an optical memory disc of claim 56 and further comprising the step of discharging fluid from said fluidic jet which is an inert gas selected from the group consisting of nitrogen, argon and helium.

58. The method for trimming dye coated on a recordable disc substrate during production of an optical memory disc of claim 56 and further comprising the step of discharging air from said fluidic jet.

59. The method for trimming dye coated on a recordable disk substrate during production of an optical memory disc of claim 56 and further comprising the step of discharging cryogenic liquid from said fluidic jet which is selected from the group consisting of nitrogen and carbon dioxide.

60. The method for trimming dye coated on a recordable disc substrate during production of an optical memory disc of claim 56 and further comprising the step of discharging fluid from said fluidic jet which is a reactive fluid.

61. The method for trimming dye coated on a recordable disc substrate during production of an optical memory disc of claim 60 wherein the reactive fluid is selected from the group consisting of oxygen, methane and carbon monoxide.

62. An apparatus for trimming dye coated on an outer edge of a recordable disc substrate during production of an optical memory disc comprising:
a substrate support for supporting the disc substrate;
an optical assembly having means for receiving laser energy and for directing said laser energy directly upon the outer edge of the substrate to trim the dye coated thereon and thereby produce byproducts of the trimming operation; and
means for removing the byproducts of the trimming operation from the substrate.

63. An apparatus for trimming dye coated on an outer edge of a recordable disc substrate during production of an optical memory disc comprising:
a substrate support for supporting the disc substrate;
an optical assembly having means for receiving laser energy and for directing said laser energy directly upon the outer edge of the substrate to trim the dye coated thereon and thereby produce byproducts of the trimming operation wherein said laser energy receiving and directing means includes a focusing optic system for collimating the laser beam and directing the laser beam directly upon the substrate to trim the dye coated thereon wherein the laser beam has a wavelength between approximately 450 and 800nm, is collimated by said focusing optic system with a diameter of between approximately 0.5 to 1.5 mm, and is collimated within a length of between approximately 2 to 5 mm;
laser generation means for producing the laser energy and for supplying said laser energy to said laser energy receiving and directing means wherein the laser beam is produced with a maximum power of approximately 12 watts; and
means for removing the process byproducts from the substrate.

64. A method for trimming dye coated on an outer edge of a recordable disc substrate during production of an optical memory disc, said method comprising the steps of:
supporting the disc substrate on a substrate support;
receiving laser energy and directing the laser energy directly upon the outer edge of the disc substrate by means of an optical assembly to trim the dye coated thereon and thereby produce process byproducts; and
removing the process byproducts from the rotatable disc substrate.

65. A method for trimming dye coated on an outer edge of a recordable disc substrate during production of an optical memory disc, said method comprising the steps of:
supporting the disc substrate on a substrate support;
generating laser energy from a laser energy generation means with a maximum power of approximately 12 watts and supplying the laser energy to an optical assembly;
shaping and collimating the laser beam in a focusing optic system of said optic assembly and directing the laser beam directly upon the outer edge of the substrate to trim the dye coated thereon and thereby produce process byproducts wherein the laser beam has a wavelength of between approximately 450 and 800 nm, is collimated by said focusing optic system with a diameter of between approximately 0.5 to 1.5 mm, and is collimated within a length of between approximately 2 to 5 mm; and
removing the trimmed process byproducts from the substrate.

66. An apparatus for trimming dye coated on a recordable disc substrate during production of an optical memory disc comprising:
substrate rotation means for rotating the disc substrate on a support axis;
an optical assembly having means for receiving laser energy and for directing said laser energy directly upon the rotatable substrate to trim the dye coated thereon and thereby produce byproducts of the trimming operation; and
means for removing the byproducts of the trimming operation from the substrate wherein said byproduct removing means is a fluidic jet for directing the process byproducts away from the rotatable disc substrate, said fluidic jet having an angularly disposed dispersion orifice which is angularly displaced at an angle of between approximately 5° to 80° from said support axis and wherein the fluid discharged from said fluidic jet is a cryogenic liquid selected from the group consisting of nitrogen and carbon dioxide.

67. A method for trimming dye coated on a recordable disc substrate during production of an optical memory disc, said method comprising the steps of:
rotating the disc substrate by means of substrate rotation means;
receiving laser energy and directing laser energy directly upon the disc substrate by means of an optical assembly to trim the dye coated thereon and thereby produce process byproducts;
removing the process byproducts from the rotatable disc substrate by means of a fluidic jet; and
discharging a cryogenic liquid from the fluidic jet selected from the group consisting of nitrogen and carbon dioxide.

* * * * *